(12) United States Patent
Sayeedi (10) Patent No.: US 7,133,672 B2
(45) Date of Patent: Nov. 7, 2006

(54) METHOD AND APPARATUS FOR REGISTRATION OF A MOBILE STATION IN A PACKET DATA COMMUNICATION SYSTEM

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 570 days.

(21) Appl. No.: 10/337,519

(22) Filed: Jan. 6, 2003

(65) Prior Publication Data

US 2003/0129980 A1    Jul. 10, 2003

Related U.S. Application Data

(60) Provisional application No. 60/346,669, filed on Jan. 8, 2002.

(51) Int. Cl.
    *H04Q 7/20* (2006.01)
(52) U.S. Cl. .................. 455/435; 370/330; 380/247
(58) Field of Classification Search ................ 455/435; 370/331; 380/297
    See application file for complete search history.

(56) References Cited

U.S. PATENT DOCUMENTS

| | | | |
|---|---|---|---|
| 5,588,043 A * | 12/1996 | Tiedemann, Jr. et al. ... | 455/435 |
| 5,675,629 A | 10/1997 | Raffel et al. | |
| 5,884,172 A * | 3/1999 | Sawyer ..................... | 455/435 |
| 5,901,353 A | 5/1999 | Pentikanen | |
| 5,911,120 A | 6/1999 | Jarett et al. | |
| 6,018,573 A | 1/2000 | Tanaka | |
| 6,173,182 B1 * | 1/2001 | Cha ........................... | 455/435 |
| 6,473,411 B1 * | 10/2002 | Kumaki et al. ............ | 370/330 |
| 2002/0012433 A1 * | 1/2002 | Haverinen et al. .......... | 380/247 |
| 2003/0050090 A1 | 3/2003 | Raffel et al. | |

* cited by examiner

*Primary Examiner*—William D. Cumming
(74) *Attorney, Agent, or Firm*—Steven A. May (57) ABSTRACT

An ordered registration of a mobile station (MS) is initiated by a radio access network that includes a base station (BS) in communication with a downstream network entity. The downstream entity conveys a message to the BS requesting that the MS be instructed to register. The BS then transmits a message to the MS that instructs the MS to register. In response to receiving the registration instruction, the MS transmits a registration message to the BS. Upon receiving a registration message, the BS conveys a message to the downstream entity requesting an update of a location of the MS. The downstream network entity updates the MS's location and conveys a message to the BS confirming an updating of the location of the MS. In another embodiment of the present invention, the MS can initiate a user-zone based registration by conveying a user-zone based registration message to the BS.

26 Claims, 5 Drawing Sheets

| 7 | 6 | 5 | 4 | 3 | 2 | 1 | 0 | OCTET |
|---|---|---|---|---|---|---|---|---|
| \multicolumn{8}{|l|}{MESSAGE TYPE = [xxH]} | 1 |
| \multicolumn{8}{|l|}{⇒ MOBILE IDENTITY (IMSI/ESN):  A1 ELEMENT IDENTIFIER = [0DH]} | 1 |
| \multicolumn{8}{|l|}{LENGTH = [05H–08H] (10–15 DIGITS)} | 2 |
| \multicolumn{4}{|l|}{IDENTITY DIGIT 1 = [0H–9H] (BCD)} | \multicolumn{2}{l|}{ODD/EVEN INDICATOR = [1.0]} | \multicolumn{2}{l|}{TYPE OF IDENTITY = [101 (ESN), 110 (IMSI)]} | 3 |
| \multicolumn{8}{|l|}{IF (TYPE OF IDENTITY= 101), IDENTIFY {:} | |
| \multicolumn{8}{|l|}{(MSB)} | 4 |
| \multicolumn{8}{|l|}{ESN = <ANY VALUE>} | 5 |
| \multicolumn{8}{|l|}{} | 6 |
| \multicolumn{8}{|r|}{(LSB)} | 7 |
| \multicolumn{8}{|l|}{} OR IF (TYPE OF IDENTITY = 110), IDENTITY {:} | |
| \multicolumn{4}{|l|}{IDENTITY DIGIT 3 = [09–9H] (BCD)} | \multicolumn{4}{l|}{IDENTITY DIGIT 2 = [09–9H] (BCD)} | 4 |
| \multicolumn{8}{|c|}{...} | ... |
| \multicolumn{4}{|l|}{IDENTITY DIGIT N+1 = [09–9H] (BCD)} | \multicolumn{4}{l|}{IDENTITY DIGIT N = [09–9H] (BCD)} | n |
| \multicolumn{4}{|l|}{= [1]1]1 (IF EVEN NUMBER OF DIGITS)} | \multicolumn{4}{l|}{IDENTITY DIGIT N+2 = [0H–9H] (BCD)} | n+1 |
| \multicolumn{8}{|l|}{} TYPE OF IDENTITY | |
| \multicolumn{8}{|l|}{⇒ CELL IDENTIFIER LIST:  A1 ELEMENT IDENTIFIER = [1AH]} | 1 |
| \multicolumn{8}{|l|}{LENGTH = <VARIABLE>} | 2 |
| \multicolumn{8}{|l|}{CELL IDENTIFICATION DISCRIMINATOR = [02H–05H]} | 3 |
| \multicolumn{8}{|l|}{IF DISCRIMINATOR = 02H, CELL IDENTIFICATION {+:} | |
| (MSB) | \multicolumn{7}{l|}{CELL = [001H–FFFH]} | j |
| \multicolumn{3}{|l|}{} | (LSB) | \multicolumn{4}{l|}{SECTOR = [0H–FH] (0H = OMNI)} | j+1 |
| \multicolumn{8}{|l|}{} OR IF (DISCRIMINATIR = 05H), CELL IDENTIFICATION {+:} | |
| (MSB) | \multicolumn{7}{l|}{LAC = [0001H–FFFFH]} | j |
| \multicolumn{7}{|r|}{(LSB)} | | j+1 |
| \multicolumn{8}{|l|}{} CELL IDENTIFICATION | |

*FIG. 3*

| 7 | 6 | 5 | 4 | 3 | 2 | 1 | 0 | OCTET |
|---|---|---|---|---|---|---|---|---|
| ⇒ MESSAGE TYPE = [08H] | | | | | | | | 1 |
| ⇒ MOBILE IDENTITY (IMSI): LENGTH = [06H-08H] (10-15 DIGITS) | | | | | | | | 1 |
| IDENTITY DIGIT 1 = [0H-9H] (BCD) | | | | ODD/EVEN INDICATOR = [1,0] | TYPE OF IDENTITY = [110] (IMSI) | | | 2 |
| IDENTITY DIGIT 3 = [0H-9H] (BCD) | | | | IDENTITY DIGIT 2 = [0H-9H] (BCD) | | | | 3 |
| ... | | | | ... | | | | ... |
| IDENTITY DIGIT 1 = [0H-9H] (BCD) | | | | IDENTITY DIGIT N = [0H-9H] (BCD) | | | | n |
| = [1]1]1 (IF EVEN NUMBER OF DIGITS) | | | | IDENTITY DIGIT N+2 = [0H-9H] (BCD) | | | | |
| ⇒ CLASSMARK INFORMATION TYPE 2: A1 ELEMENT IDENTIFIER = [12H] | | | | | | | | |
| LENGTH VARIABLE> | | | | | | | | |
| MOBILE P_REV = [000-111] | | | RESERVED = [0] | SEE LIST OF ENTRIES = [0, 1] | RF POWER CAPABILITY = [000] (CLASS 1, VEHICLE & PORTABLE) | | | 3 |
| RESERVED = [00H] | | | | | | | | 4 |
| NAR_AN_CAP = [0,1] | IS.95 = [1] | SLOTTED = [0,1] | RESERVED = [00] | | DTX = [0] | MOBILE TERM = [0,1] | TIA/EIA-553 = [0,1] | 5 |
| RESERVED = [00H] | | | | | | | | 6 |
| RESERVED = [0000 00] | | | | | | MOBILE TERM = [0,1] | PSI = [0,1] | 7 |
| SCM LENGTH = [01H] | | | | | | | | 8 |
| STATION CLASS MARK = [00H-FFH] | | | | | | | | 9 |
| COUNT OF BAND CLASS ENTRIES = [01H-20H] | | | | | | | | 10 |
| BAND CLASS ENTRY LENGTH = [03H] | | | | | | | | 11 |
| *MOBILE BAND CLASS CAPABILITY ENTRY {1+:* | | | | | | | | |
| RESERVED = [000] | | | BAND CLASS n = [00000-11111] | | | | | k |
| BAND CLASS n AIR INTERFACES SUPPORTED = [00H-FFH] | | | | | | | | k+1 |
| BAND CLASS n MS PROTOCOL LEVEL = [00H-FFH] | | | | | | | | k+2 |
| *} MOBILE BAND CLASS CAPABILITY ENTRY* | | | | | | | | |

402 — (message type row)
404 — (mobile identity rows)
406 — (classmark information rows)

METHOD AND APPARATUS FOR REGISTRATION OF A MOBILE STATION IN A PACKET DATA COMMUNICATION SYSTEM

REFERENCE(S) TO RELATED APPLICATION(S)

The present application claims priority from provisional application, Ser. No. 60/346,669, entitled "METHOD AND APPARATUS FOR REGISTRATION OF A MOBILE STATION IN A PACKET DATA COMMUNICATION SYSTEM," filed Jan. 8, 2002, which is commonly owned and incorporated herein by reference in its entirety.

FIELD OF THE INVENTION

The present invention relates generally to cellular communication systems, and, in particular, to data transmission protocols in a packet data communication system.

BACKGROUND OF THE INVENTION

The TIA/EIA (Telecommunications Industry Association/Electronic Industries Association) IS-2001-A, or 3GPP2 IOS (Inter Operability Specification), standard provides a compatability standard for cellular mobile telecommunications systems that operate as a cdma2000, IXEV-DO or any other technology supported by an A.S0001/IS-2001 based Access Network. The standard ensures that a mobile station (MS) operating in a cdma2000 system can obtain communication services when operating in a cellular communication system or personal communication system (PCS) manufactured according to the standard. To ensure compatibility, radio system parameters and call processing procedures are specified by the standard, including call processing steps that are executed by an MS and a base station (BS) serving the MS in order to establish a call and digital control messages and analog signals that are exchanged between elements of an infrastructure that includes the BS.

A typical cdma2000 radio access network (RAN) includes a BS in communication with a mobile station (MS). The BS typically includes a base transceiver station (BTS) in communication with a base station controller (BSC). The BS is, in turn, in communication with a mobile switching center (MSC) and/or a packet control function (PCF). In turn, the PCF is typically in communication with a packet data service node (PDSN). An interface between the BS and the MSC includes an A1 interface that provides a call control and mobility management interface between the BS and the MSC, an A2 bearer interface for PCM between a switch component of the MSC and an SDU function of the BS, and an A5 bearer interface for circuit data between a switch component of the MSC and an SDU function of the BS that together provide call switching interfaces between the BS and the MSC. An interface between the BS and the PCF includes an A8 interface that provides a bearer path between the BS and the PCF and an A9 interface that provides a signaling interface between the BS and the PCF. An interface between the PCF and the PDSN includes an A11 signaling connection and an A10 bearer connection.

When an MS is activated by a user, the MS registers with the RAN. Registration initiated by the MS is known as 'autonomous registration.' Registration is a process by which the MS notifies the RAN of, among other things, a location, status, and identification of the MS. As part of the registration process, an MS operating in a slotted mode further provides a slot cycle parameter, so that the RAN can determine which paging channel or forward common control channel slots are being monitored by the MS, and a protocol revision number, so that the RAN knows the capabilities of the MS. The RAN can then use the location information and the slot cycle parameter to page the MS via a serving BS when establishing an MS terminated call.

However, instances exist where it is desirable for the RAN to initiate a registration by an MS, that is, an 'ordered registration.' For example, 'ordered registration' may be desirable prior to intersystem short message service (SMS) delivery in areas where only zone-based registration is enabled to allow for more efficient subsequent delivery of voice or SMS, when a system turns off autonomous registration to reduce common channel traffic, when a timed out VLR record is deleted, or when an update of the MS's location is immediately required. Currently, the IOS RAN specification does not provide for a RAN-initiated location registration.

Therefore a need exists for a method and an apparatus that provides a RAN the capability to support RAN-initiated location registration.

BRIEF SUMMARY OF THE INVENTION

In order to provide a radio access network (RAN) the capability to support RAN-initiated location registration, a communication system is provided wherein an ordered registration of a mobile station (MS) can initiated by a RAN that includes a base station (BS) in communication with a downstream network entity. The downstream entity conveys a message to the BS requesting that the MS be instructed to register. The BS then transmits a message to the MS that instructs the MS to register. In response to receiving the registration instruction, the MS transmits a registration message to the BS. Upon receiving a registration message, the BS conveys a message to the downstream entity requesting an update of a location of the MS. The downstream network entity updates the MS's location and conveys a message to the BS confirming an updating of the location of the MS. In another embodiment of the present invention, the MS can initiate a user-zone based registration by conveying a user-zone based registration message to the BS.

DETAILED DESCRIPTION OF THE INVENTION

To address the need for a method and an apparatus that provides a radio access network (RAN) the capability to support RAN-initiated location registration, an ordered registration of a mobile station (MS) is initiated by a RAN that includes a base station (BS) in communication with a downstream network entity. The downstream entity conveys a message to the BS requesting that the MS be instructed to register. The BS then transmits a message to the MS that instructs the MS to register. In response to receiving the registration instruction, the MS transmits a registration message to the BS. Upon receiving a registration message, the BS conveys a message to the downstream entity requesting an update of a location of the MS. The downstream network entity updates the MS's location and conveys a message to the BS confirming an updating of the location of the MS. In another embodiment of the present invention, the MS can initiate a user-zone based registration by conveying a user-zone based registration message to the BS.

Generally, an embodiment of the present invention encompasses a method for initiating an ordered registration of a mobile station with a network. The method includes steps of receiving, from a downstream network entity, a registration request that requests that the mobile station be instructed to register and transmitting a registration order to the mobile station that instructs the mobile station to register with the network. The method further includes steps of receiving a registration message from the mobile station, conveying a location update request to the downstream network entity that requests an update of a location of the mobile station, and receiving a location update confirmation message that confirms an updating of the location of the mobile station.

Another embodiment of the present invention encompasses an apparatus capable of initiating a registration of a mobile station with a network. The apparatus includes a base station that receives a registration request from the network that requests that the mobile station be instructed to register, transmits a registration order to the mobile station that instructs the mobile station to register with the network, receives a registration message from the mobile station, conveys a location update request to the network that requests an update of a location of the mobile station, and receives, from the network, a location update confirmation message that confirms an updating of the location of the mobile station.

Still another embodiment of the present invention encompasses a computer readable registration request message for conveyance by a downstream network entity to an upstream network entity to initiate a registration of a mobile station. The message includes a first set of data that indicates that the message is a registration request and a second set of data that identifies the mobile station whose registration is being requested.

Yet another embodiment of the present invention encompasses a computer readable location updating request message for conveyance by an upstream network entity to a downstream network entity requesting that the downstream network entity update a location of a mobile station. The message includes a first set of data that indicates that the message is a location update request. The message further includes a second set of data identifies a cell receiving a request from the mobile station to register with a network that comprises the upstream network entity and the downstream network entity. The message further includes a third set of data that informs of at least one of whether a registration of the mobile station is pursuant to a request to register received by the mobile station and whether the mobile station initiated the registration in order to register in a user zone selected by the mobile station while the mobile station is in an activated but idle state.

Still another embodiment of the present invention encompasses a method for initiating a registration of a mobile station with a network. The method includes steps of receiving a registration message from the mobile station that indicates that the mobile station desires to initiate a user-zone based registration and, in response to receiving the registration message, conveying a location update request to a downstream network entity that indicates that the mobile station seeks to register in a user zone selected by the mobile station while the mobile station is in an activated but idle state and requesting an update of a location of the mobile station.

Figure 1:
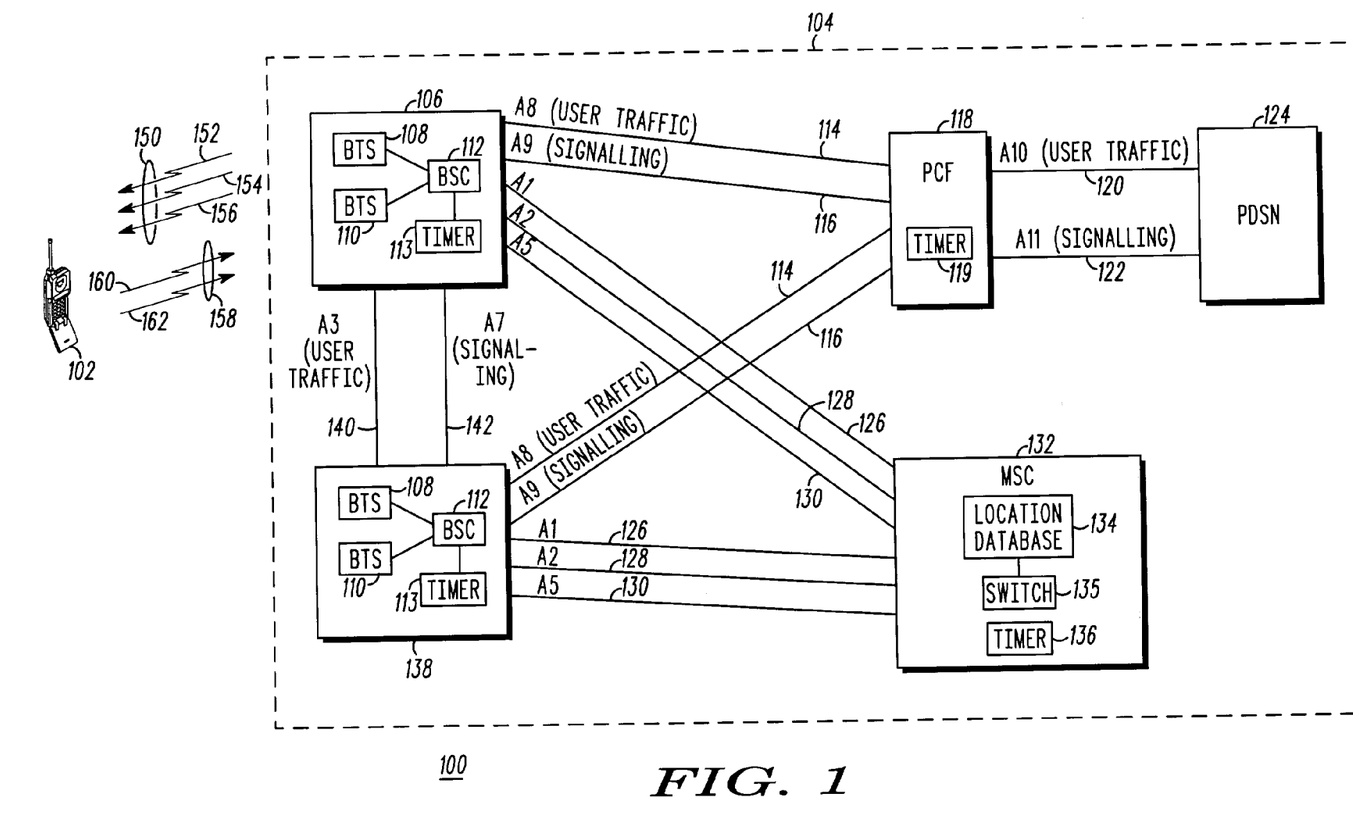
FIG. 1 is a block diagram of a wireless communication system in accordance with an embodiment of the present invention.

The present invention may be more fully described with reference to FIGS. 1–4. FIG. 1 is a block diagram of a wireless communication system 100 in accordance with an embodiment of the present invention. Communication system 100 includes at least one mobile station (MS) 102 and a radio access network (RAN) 104. RAN 104 includes multiple base stations (BS's) 106, 138 (two shown). Each BS of the multiple BS's 106, 138 includes multiple base transceiver stations (BTS's) 108, 110 (two shown) and a timer 113 that are each operably coupled to a base station controller (BSC) 112. Each BS 106, 138 provides communications services via a forward link 150 and a reverse link 158 to mobile stations located in a coverage area serviced by the BS, which coverage area may be subdivided into multiple sectors, or cells. Each forward link 150 includes a paging channel 152, a forward common signaling channel 154, and a forward traffic channel 156. Each reverse link 158 includes a reverse common signaling channel 160 and a reverse traffic channel 162.

RAN 104 further includes at least one packet control function (PCF) 118 and a mobile switching center (MSC) 132 that are each operably coupled to each of BS's 106, 138, and a Packet Data Service Node (PDSN) 124 that is operably coupled to PCF 118. In another embodiment of the present invention, RAN 104 may include multiple PCF's, wherein each of the multiple BSC's 112 is coupled to a separate, different PCF. MSC 132 includes a location database 134 that stores a location of each MS serviced by MSC 132 and further includes a communications switch 135 and a timer 136. However, in another embodiment of the present invention, location database 134 may be located external to MSC 132 in RAN 104 and operably coupled to the MSC.

BS's 106, 138 communicate with each other via an A3/A7 interface that includes an A3 interface 140 that provides a signaling and bearer path between the SDU function and the channel element components of the BS (BTS) and an A7 signaling interface 142 between a source and target BS. Each of BS's 106, 138 communicates with PCF 118 via an Aquinter, or A8/A9, interface that includes an A8 interface 114 that provides a bearer path between the BS and the PCF and an A9 signaling interface 116. PCF 118 and PDSN 124 communicate with each other via an A10/A11 interface that includes an A10 interface 120 that provides a bearer path between the PCF and the PDSN and an A11 signaling interface 122. Each of BS's 106, 138 communicates with MSC 132 via an A1/A2/A5 interface that includes an A1 signaling interface 126, an A2 bearer interface 128, and an A5 bearer interface 130 for circuit data. Each of MS 102, BTS's 108 and 110, BSC 112, PCF 118, PDSN 124, and MSC 132 includes a processor, such as a microprocessor or digital signal processor (DSP), and an associated memory that stores software, such as programs, applications, and operating protocols, that are executed by the processor and permits the functioning of the respective MS, BTS, BSC, PCF, PDSN, and MSC.

Preferably, communication system 100 operates in accordance with the 3GPP2 and TIA/EIA (Telecommunications Industry Association/Electronic Industries Association) A.S0001/IS-2001, or IOS (Inter Operability Specification), standard, which provides a compatability standard for cdma2000, that is, including IS-2000 or 1xEV-DO air interfaces, and RAN 104 is an A.S0001-A/IS-2001-B radio access network. The standard specifies wireless telecommunications system operating protocols, including radio system parameters and call processing procedures. By operating in accordance with well-known protocols, a user of MS 102 can be assured that MS 102 will be able to communicate with RAN 104 and establish a packet data communication link with the external network via the RAN. However, those who are of ordinary skill in the art realize that communication system 100 may operate in accordance with any one of a variety of wireless packet data communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

When a user of MS 102 activates the MS, the MS initiates an autonomous registration procedure by which the MS registers with RAN 104 in accordance with well-known registration techniques. As part of the autonomous registration procedure, a location of MS 102 is determined and stored in location database 134. RAN 104 then assigns one of the multiple base stations, such as base station 106, to provide communication services to MS 102. However, in certain situations, it is desirable for RAN 104 to initiate, or order, a registration of MS 102. For example, a RAN 104-initiated registration may be desirable prior to intersystem short message service (SMS) delivery to allow for efficient delivery of voice or SMS to MS 102 by the RAN, or when RAN 104 turns off autonomous registration to reduce traffic over a common signaling channel 154, when a timed out VLR record is deleted, or when an update of a location of MS 102 is desired.

Figure 2:
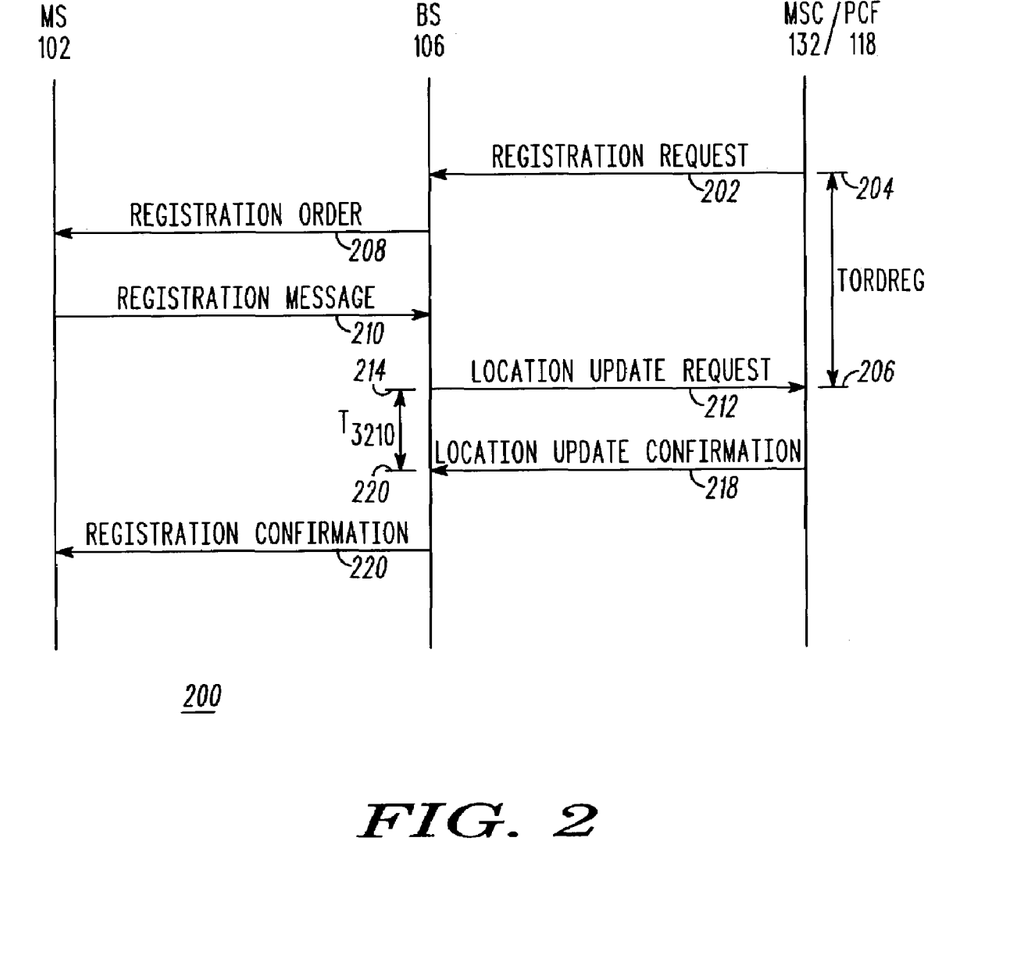
FIG. 2 is a call flow diagram of a process by which the radio access network of FIG. 1 initiates a registration of the mobile station of FIG. 1 in accordance with an embodiment of the present invention.

FIG. 2 is a call flow diagram 200 of a process by which RAN 104 initiates an ordered registration of MS 102 in accordance with an embodiment of the present invention. The signal flow begins when a downstream network entity, that is, MSC 132, initiates a registration of MS 102 by sending (202) a registration request to an upstream network entity, preferably a BS that is providing communication services to the MS, that is, BS 106. The registration request requests that the BS 106 instruct, or order, MS 102 to register with RAN 104. Preferably the registration request is an A1-Registration Request message, preferably a Base Station Subsystem Mobile Application Part (BSMAP) message, that is conveyed to BS 106 by MSC 132 via A1 interface 126. However, in another embodiment of the present invention, the registration request may comprise a modified version of a message currently exchanged between the downstream network entity, that is, MSC 132, and the upstream network entity, that is, BS 106, such as an A1-Paging Request message, that is modified to include a data field to indicate that mobile station registration is required. When MSC 132 sends the registration request, the MSC also starts (204) a registration timer, preferably timer 136 included in the MSC. The registration timer, that is, timer 136, is used by MSC 132 to measure the time expiring between the sending by the MSC of a registration request and, in response thereto, the receipt by the MSC of a location update request that is described below in greater detail.

Figure 3:
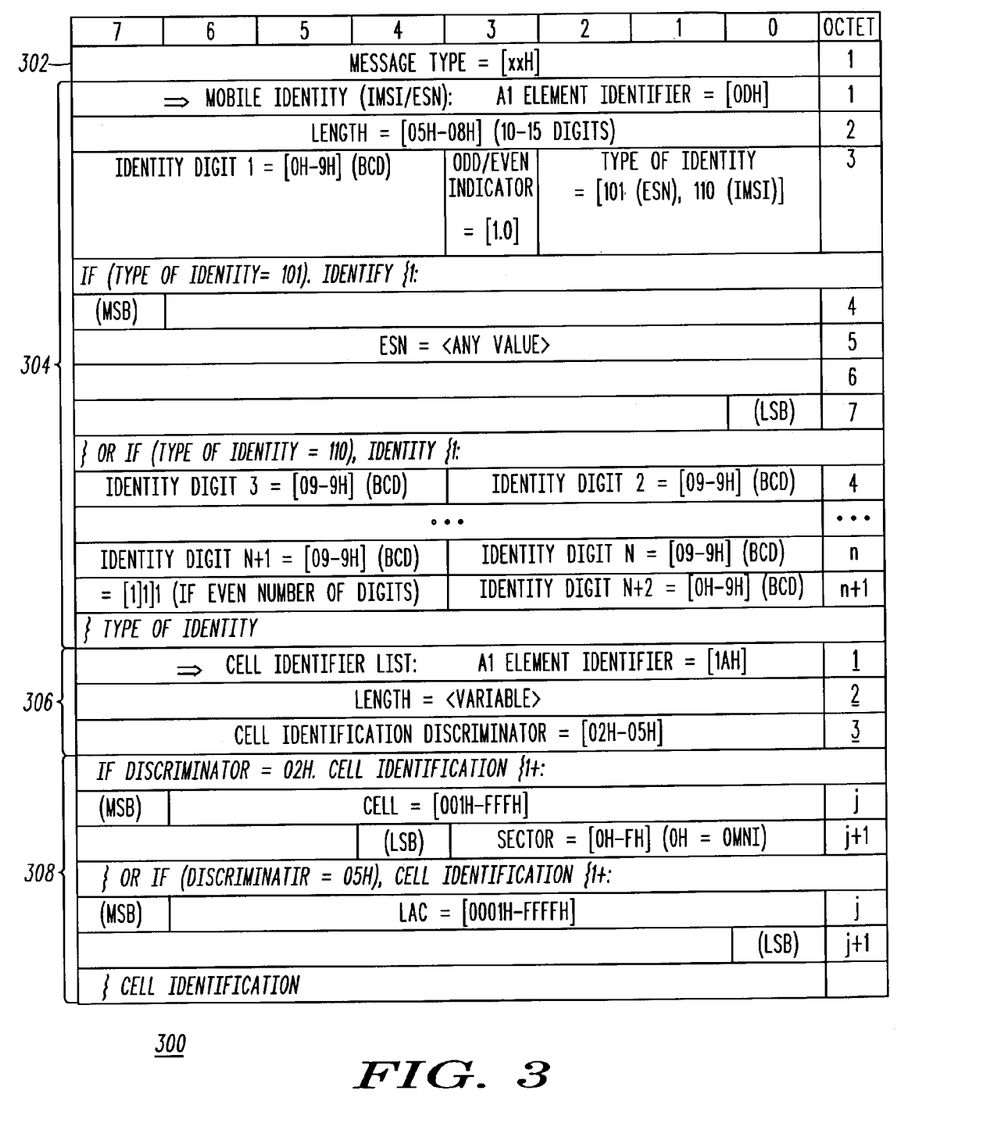
FIG. 3 is a bitmap layout of a Registration Request message in accordance with an embodiment of the present invention.

FIG. 3 is a bitmap layout of an A1-Registration Request message 300 in accordance with an embodiment of the present invention. A1-Registration Request message 300 includes the following sets of data: a first set of data, preferably a message type indicator data field, 302 that informs that this is an A1-Registration Request message that is conveyed over an A1 interface (i.e., A1 interface 126); a second set of data, preferably a mobile identifier data field, 304 that is uniquely associated with, and identifies, the MS whose registration is being ordered (i.e., MS 102); and a third set of data, preferably a cell identifier list, 306, 308 that comprises a list of cells that must transmit the message to MS 102, which cells preferably are identified by a type 2 or type 5 identifier as specified in the TIA/EIA IS-2001-A standard, section 5.2.18. In another embodiment of the present invention, the cell identifier list 306, 308 may not be included in the A1-Registration Request message, in which instance all cells within the BS are then required to transmit a registration order.

Upon receiving a registration request from MSC 132, BS 106 transmits (208) a registration order on paging channel 152 or forward signaling channel 154 to MS 102. The registration order instructs MS 102 to register with RAN 104 and preferably i s a Registration Request Order message. Registration Request Order messages are well-known in the art and are described in the TIA/EIA IS-2000.5-A-1 upper layer signaling specification sections 3.7.4 and 3.7.2.3.2.7. However, in another embodiment of the present invention, BS 106 may initiate the registration of MS 102 by transmitting a registration order to MS 102 without first receiving a registration request from MSC 132. Preferably, the registration order further identifies the MS that is being ordered to register and identifies the message as a registration order. The BS that is sending the order may not be identified in the registration order since the MS knows which cell and BS sent the message because the MS is monitoring the cell and BS.

Upon receiving the registration order, MS 102 then registers with RAN 104 by transmitting (210) a registration message on reverse common signaling channel (r-csch) 160 back to BS 106. Registration messages are well-known in the art and are described in the TIA/EIA IS-2000-A-1 air interface standard, section 2.7.1.3.2.1. Preferably, the registration message includes information informing RAN 104 of the location of the MS, that is, MS 102. Preferably, the registration message further includes mobile band class capability information that informs of the frequency bands in which the registering MS is capable of operating.

Methods by which an MS may determine the MS's location are well known in the art. For example, an MS may include a Global Positioning Satellite (GPS) receiver and may self-determine it's location by reference to a constellation of GPS satellites. By way of another example, a location of an MS can be determined by reference to at least three time-synchronized BS's. To determine the MS's location, each BS transmits signals to the MS. Each signal includes an identifier that uniquely corresponds to the BS transmitting the respective signal. Each signal also includes a time of transmission indication relative to a common time base. The MS is then able to determine its location based on time differences of arrival (TDOA) of the signals and known locations of the BS's.

In another embodiment of the present invention, the registration message may include time differences of arrival of the signals determined by the MS for the signals transmitted by three base stations and may further include each base station's identifier. The RAN may then determine the location of the MS based on the determined time differences of arrival and by reference to a database (not shown) stored in the RAN that includes the location of each base station in the RAN.

Upon receiving the registration message, BS 106 transmits (212) a location update request to the downstream entity that initiated the registration process, that is, MSC 132, via the A1 interface 126, and starts (214) a location update timer, preferably timer 113 included in the BS. The location update request informs of a location of the MS sourcing the request, that is, MS 102, based on the location provided by the MS in the Registration message and requests that MSC 132 update a location of MS 102 to the location provided in the Registration message. The location update request further informs whether the registration is an ordered registration, that is, whether the registering MS is registering pursuant to an instruction received from RAN 104. The location update request may further include user zone registration information that indicates whether the registration is initiated by an MS seeking to register in a user zone selected by the MS while the MS is in an activated but idle state.

Figure 4A:
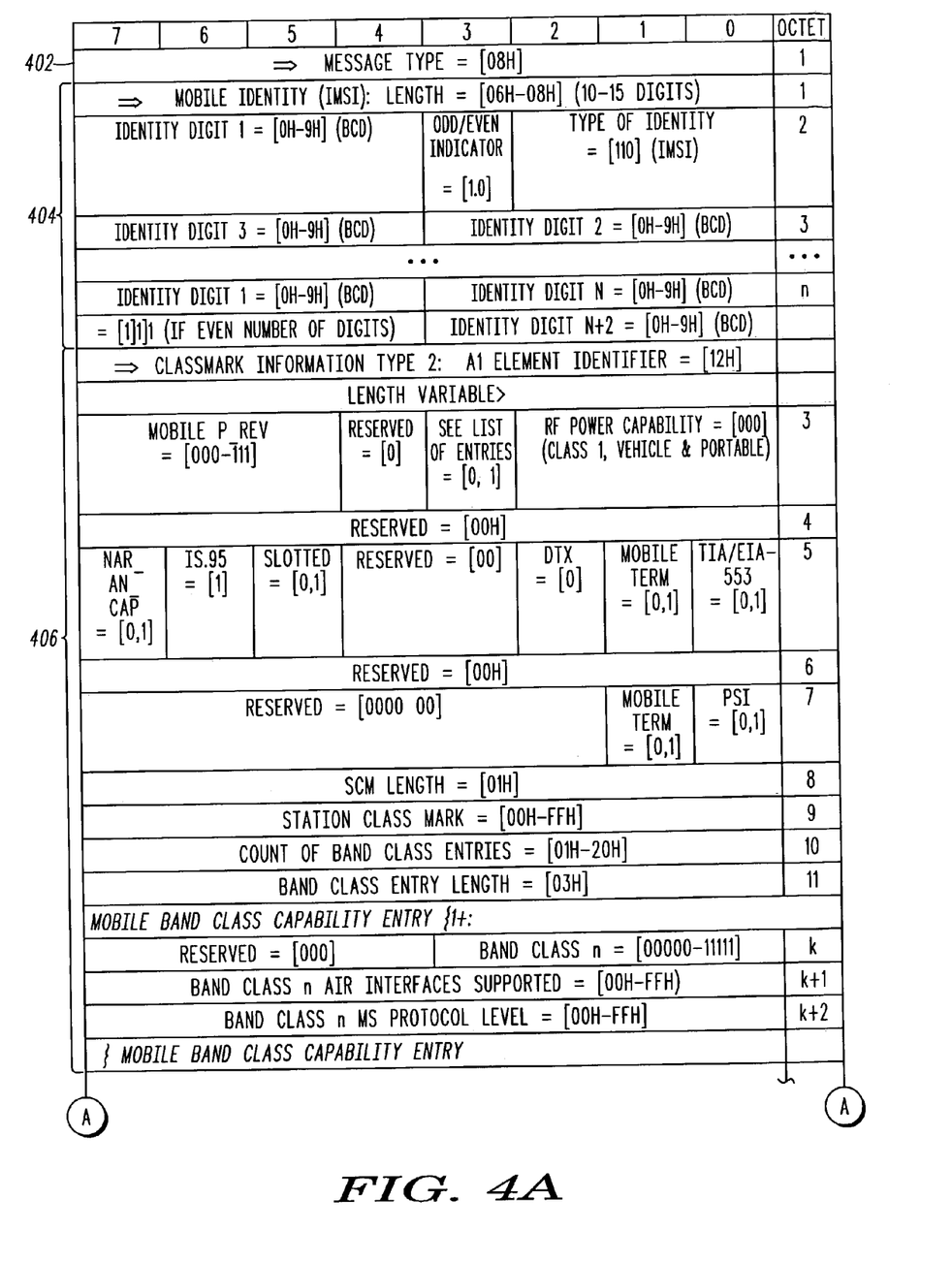
FIG. 4a is a partial bitmap layout of a Location Updating Request message in accordance with an embodiment of the present invention.
Figure 4B:
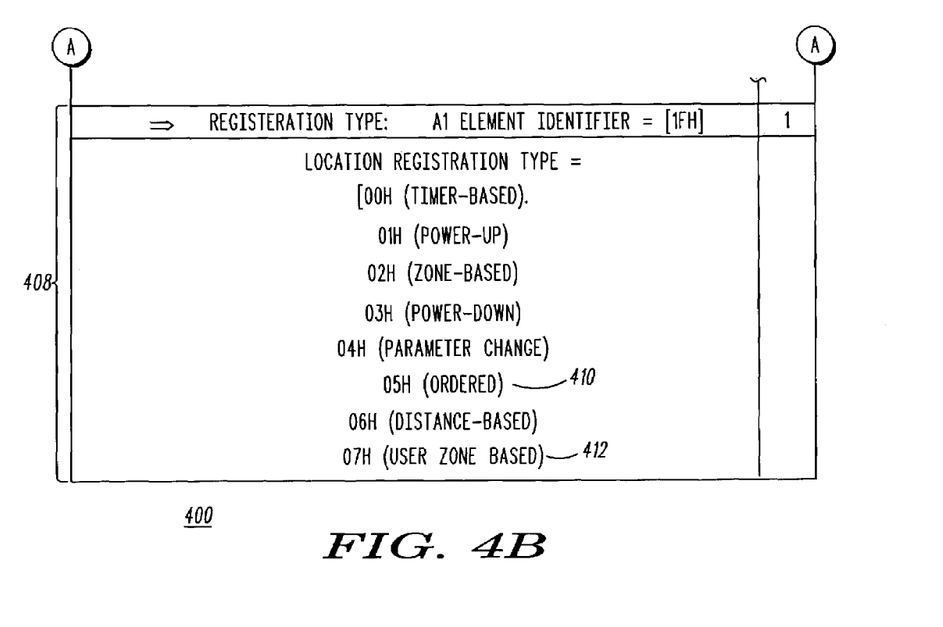
FIG. 4b is a partial continuation of the bitmap layout of a Location Updating Request message of FIG. 4a in accordance with an embodiment of the present invention.

Preferably, the location update request exchanged between BS 106 and MSC 132 is a Direct Transfer Application Part (DTAP) message, and in particular a Location Updating Request message as is described in the TIA/EIA IS-2001-/A.S0001-A standard except that the message has been modified in accordance with an embodiment of the present invention to provide ordered registration and user zone based registration information. Referring now to FIGS. 4a and 4b, a partial bitmap layout is illustrated of the modified Location Updating Request message 400. Location Updating Request message 400 includes a first set of data, preferably a message type indicator data field, 402 that informs that this is a Location Updating Request message, a second set of data, preferably a mobile identifier data field, 404 that is uniquely associated with, and identifies, the registering MS (i.e., MS 102), a third set of data, preferably a classmark information data field, 406 that identifies attributes of the MS and informs of the band class capability of the registering MS, and a fourth set of data, preferably a Registration Type data field, 408 that specifies a type of registration being performed by the MS. Registration type data field 408 includes a first data subset, preferably an 'ordered' data field, 410 that informs whether the registration is an ordered registration wherein the registering MS is registering pursuant to an instruction received from RAN 104 and a second data subset, preferably a 'user zone based' data field, 412 that indicates that a registration is initiated by an MS seeking to register in a user zone selected by the MS while the MS is in an activated but idle state. The changes we are making to this message are the new 'ordered' and 'user zone based' registration types. $T_{ordreg}$ is a new timer we are specifying. Should this be pointed out? It isn't clear from the text.

When MSC 132 receives the location update request prior to an expiration of a first predetermined time period, $T_{ordreg}$, from the time that the MSC transmitted the registration request, the MSC stops (206) timer 136, updates the location of MS 102 stored in location database 134 based on the location provided in the location update request, and transmits (218) a location update confirmation message to base station 106 via A1 interface 126 confirming that the location of the registering MS, that is, MS 102, has been updated. Preferably, the location update confirmation message is a Location Updating Accept message that confirms that the location update request has been successfully processed and that the stored location of MS 102 has been updated. Location Updating Accept messages are well-known in the art and are described in the IS-2001-A/A.S0001-A specification. $T_{ordreg}$ is determined by MSC 132 by reference to timer 136 and has a range of 1 to 99 seconds. Preferably, $T_{ordreg}$ has a duration of $4.72+1.28*2^{Slot\ Cycle\ Index}$ seconds if MS 102 is operating in a slotted mode and 10 seconds if MS 102 is not operating in a slotted mode.

When MSC 132 fails to receive the location update request prior to the expiration of the predetermined time period $T_{ordreg}$, the registration process may end or the MSC may restart registration process 200 by retransmitting a registration request to BS 106. In the latter instance, after a predetermined number of attempts by MSC 132 to order a registration of MS 102 without receiving the location update request within the first predetermined time period, the process ends. However, in another embodiment of the present invention, after a predetermined number of attempts by MSC 132 to order a registration of MS 102 without receiving the location update request within the first predetermined time period, the MSC may transmit a registration request to a different BS, such as BS 138, and/or to additional cells in the current BS 106 and repeat ordered registration process 200 with respect to the different BS and/or the additional cells.

When BS 106 receives the location update confirmation message prior to an expiration of a second predetermined time period, $T_{3210}$, from the time that the BS transmitted the location update request, BS 106 stops (216) location update timer 113 and transmits (220), to MS 102 via forward common signaling channel (f-csch) 154, a registration confirmation message that confirms that the registration message of MS 102 has been accepted by RAN 104 and that a location of the MS has been updated. Preferably, the registration confirmation message is a Registration Accepted Order message, which message is well-known in the art and is described in the EIA/TIA IS-2000-A-1 standard, section 3.7.4.5. BS 106 determines whether the second predetermined time period, $T_{3210}$, has expired by reference to the location update timer, that is, timer 113. However, in another embodiment of the present invention, the registration confirmation message is not transmitted.

When BS 106 fails to receive the location update confirmation message prior to the expiration of the second predetermined time period, $T_{3210}$, the BS may retransmit the location update request to MSC 132 and restart location update timer 113. After a predetermined number of attempts by BS 106 to transmit the location update request to MSC 136 without receiving the location update confirmation message in response within the second predetermined time period, the process ends.

In yet another embodiment of the present invention, the downstream network entity initiating the registration of MS 102 may be PCF 118 instead of MSC 132. That is, PCF 118 may perform the functions described above with respect to MSC 132, except that PCF 118 uses an A9 interface 116 to communicate with BS 106 instead of an A1 interface 126. However, those who are of ordinary skill in the art realize that any downstream network entity in communication with a BS servicing MS 102 (i.e., BS 106), may initiate a registration of MS 102 without departing from the spirit and scope of the present invention. That is, again referring to FIG. 2 but substituting PCF 118 and A9 interface 116 for MSC 132 and A1 interface 126, PCF 118 initiates the ordered registration process by transmitting (202) a registration request to BS 106. Preferably the registration request is an A9-Registration Request message that is conveyed to BS 106 by PCF 118 via an A9 interface 116. However, in another embodiment of the present invention, the registration request may comprise a modified version of a message currently exchanged between PCF 118 and BS 106, such as an A9-Paging Request message, that is modified to include a data field to indicate that mobile station registration is required. The composition of the A9-Registration Request message is similar to the composition of A1-Registration Request message 300 except that message type data field 302 in the Registration Request message identifies the message as an A9 interface message that is conveyed over an A9 interface (i.e., A9 interface 116) instead of an A1 interface and the message is not a BSMAP message and therefore the transmitted message does not have an SCCP header added to it. When PCF 118 transmits the A9-Registration Request message, the PCF also start a registration timer, preferably timer 119 included in the PCF.

Similar to MSC 132, PCF 118 then awaits receipt of a location update request, preferably an A9-Location Updating Request message (which is an A9 version of the modified A1-Location Updating Request message 400 but is not a DTAP message and does not have an SCCP header added to it) from BS 106 via A9 interface 116 in response to transmission of the registration request. When PCF 118 receives the location update request message prior to an expiration of the first predetermined time period, $T_{ordreg}$, from the time that the PCF transmitted the registration request, the PCF stops (206) timer 119, updates the location of MS 102 stored in location database 134, and transmits (218) a location update confirmation message, preferably an A9-Location Updating Accept message, via A9 interface 116 to BS 106. Preferably, in this embodiment of the present invention wherein PCF 118 is acting as the downstream entity, location database 134 is located in RAN 104 external to MSC 132 and is operably coupled to PCF 118. The BS sourcing the location update confirmation message (i.e., BS 106) is identified by the A9 interface 116 via which the message is received.

When PCF 118 fails to receive the location update request prior to the expiration of a first predetermined time period $T_{ordreg}$, the registration process may end or the PCF may restart registration process 200 by retransmitting a registration request to BS 106. After a predetermined number of attempts by PCF 118 to order a registration of MS 102 without receiving a responsive location update request within the first predetermined time period, the process ends. However, in still another embodiment of the present invention, after a predetermined number of attempts by PCF 118 to order a registration of MS 102 without receiving a location update request within the first predetermined time period, the PCF may transmit a registration request to a different BS, such as BS 138 and/or specify additional cells required to send out the registration order, and repeat ordered registration process 200 with respect to the different BS.

By providing a registration request that is sent by a downstream network entity, such as MSC 132 or PCF 118, to an upstream network entity, such as BS 106, that is in communication with an MS (i.e., MS 102), communication system 100 can initiate an ordered registration of the MS. The registration request requests that the upstream network entity instruct, or order, the MS to register. The upstream network entity, that is, BS 106, upon receiving the registration request, conveys a registration order to MS 102 instructing the MS to register. In response to receiving the registration order, MS 102 registers by sending a registration message to BS 106 and the BS, in turn, then sends a location update request to originating MSC 132 or PCF 118. Upon receipt of the location update request, the originating MSC 132 or PCF 118 updates a location of MS 102 in a location database 134 and conveys a location update confirmation message to BS 106. BS 106 may then send a registration confirmation message to MS 102 confirming the registration.

When a first predetermined time period expires after MSC 132 or PCF 118 sends the registration request to BS 106 and before the MSC or PCF receives a responsive location update request, the MSC or PCF may repeat the registration process by resending the registration request to BS 106. In addition, when a second predetermined time period expires after BS 106 sends the location update request to MSC 132 or PCF 118 and before the BS receives a location update confirmation message in response, the BS may resend the location update request to the MSC or PCF. By providing an Network initiated ordered registration procedure, communication system 100 is able to provide force the mobile to register with the network, regardless of what type of registration the mobile is programmed to perform, if any. Some examples of when this might be desirable include more efficient intersystem short message service (SMS) delivery in areas where only zone-based registration is enabled, when a timed out VLR record is deleted, when an update of the MS's location is immediately required, or after the system turns off autonomous registration to reduce common channel traffic.

In still another embodiment of the present invention, instead of RAN 104 initiating a registration of an activated MS 102, the MS may select an active user zone in which it desires to register and initiate a registration in the selected user zone while activated but in an idle state. A user zone is a sub-area of a geographic area serviced by RAN 104, and encompasses coverage areas service by one or more of the multiple base stations 106, 138 included in the RAN. The concept of user zones is well-known and is described in detail in the IS-2000 standard, and in particular in sections 2.6.9.2.1 and 2.6.9.2.2 of the C.S0005-A standard. When MS 102 desires to register in the selected user zone while activated but in an idle state, the MS initiates the registration by transmitting a registration message to base station 106 as described above with respect to step 210 of call flow diagram 200. The registration message from the MS indicates user-zone based registration.

When BS 106 receives the registration message, the BS conveys a location update request, preferably a Location Updating Request message 400, to MSC 132 via an A1 interface 126 or to PCF 118 via an A9 interface 116 as described above with respect to step 212 of call flow diagram 200, and starts a location update timer, that is, timer 113, included in the BS as described above with respect to step 214. The BS may indicate that the registration is a user-zone based registration via 'user zone based' sub-field 412 of Location Updating Request message 400, which data field includes information indicating that the registration is initiated by an MS seeking to register in a user zone selected by the MS while the MS is in an activated but idle state. Location Updating Request message 400 further requests an updating of a location of MS 102 via message type data field 402.

When MSC 132, or PCF 118, receives the location update request, the MSC or PCF updates the location of MS 102 stored in location database 134 and transmits a location update confirmation message, via a respective A1 interface 126 or A9 interface 116, to BS 106 as described above with respect to step 218 of call flow diagram 200. When BS 106 receives the location update confirmation message prior to an expiration of predetermined time period $T_{3210}$ from the time that the BS transmitted the location update request, BS 106 stops timer location update timer 113 and transmits a registration confirmation message via forward common signaling channel 154 to MS 102 as described above with respect to steps 216 and 220 of call flow diagram 200. BS 106 determines whether time period $T_{3210}$ has expired by reference to location update timer 113. In another embodiment of the present invention, the registration confirmation is not transmitted.

When BS 106 fails to receive the location update confirmation message prior to the expiration of the second predetermined time period, $T_{3210}$, the BS retransmits the location update request to MSC 132 or PCF 118 and restarts location update timer 113. After a predetermined number of attempts by BS 106 to transmit the location update request to MSC 136 or PCF 118 without receiving the location update confirmation message in response within predetermined time period $T_{3210}$, the process ends. If the user-zone based registration is successful, MSC 132 or PCF 18 and/or BS 106 may then provide the MS with special features based on the current user zone of the MS. By allowing MS 102 to initiate user zone based registration, communication system 100 allows the MS to select an active user zone.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for initiating an ordered registration of a mobile station with a network comprising steps of:
   (a) receiving, by a radio access network from a downstream network entity, a registration request message that requests that the mobile station be instructed to register, wherein the registration request message comprises a first data field that indicates that the message is a registration request and a second data field that identifies the mobile station whose registration is being requested;
   (b) transmitting, by the radio access network, a registration order to the mobile station that instructs the mobile station to register with the network;
   (c) receiving a registration message from the mobile station;
   (d) conveying a location update request to the downstream network entity that requests an update of a location of the mobile station; and
   (e) receiving a location update confirmation message that confirms an updating of the location of the mobile station.

2. The method of claim 1, wherein the registration request is sent in a paging request message.

3. The method of claim 1, wherein step (a) further comprises a step of conveying, by the downstream network entity, the registration request.

4. The method of claim 3, wherein step (e) further comprises a step of conveying, by the downstream network entity, the location update confirmation message.

5. The method of claim 3, wherein step (a) further comprises a step of starting a registration timer at the downstream network entity.

6. The method of claim 1, wherein the location update request further indicates that the registration is an ordered registration and wherein step (e) comprises steps of:
   when the location update request is received by the downstream network entity prior to the expiration of a predetermined period of time after the downstream network entity conveys of the registration request, conveying, by the downstream network entity, the location update confirmation message; and
   receiving the location update confirmation message in response to the conveyance, by the downstream network entity, of the location update confirmation message.

7. The method of claim 6, wherein the method further comprises a step of:
   (f) when the location update request is not received by the downstream network entity prior to the expiration of a predetermined period of time after the downstream network entity conveys of the registration request, reconveying, by the downstream network entity, the registration request and repeating steps (a) through (e).

8. The method of claim 1, wherein step (d) further comprises a step of starting a location update timer and wherein step (e) further comprises a step of, when the location update confirmation message is not received prior to the expiration of a predetermined period of time after the conveyance of the location update request, reconveying the location update request to the downstream network entity.

9. The method of claim 1, wherein the method further comprises a step of:
   (f) transmitting a registration confirmation message to the mobile station that confirms acceptance of the registration message.

10. The method of claim 9, wherein step (d) further comprises a step of starting a location update timer and wherein step (f) comprises a step of, when the location update confirmation message is received prior to the expiration of a predetermined period of time after the conveyance of the location update request, transmitting a registration confirmation message to the mobile station that confirms acceptance of the registration message.

11. An apparatus capable of initiating a registration of a mobile station with a network, the apparatus comprising a base station that receives a registration request message from the network that requests that the mobile station be instructed to register, wherein the registration request message comprises a first data field that indicates that the message is a registration request and a second data field that identifies the mobile station whose registration is being requested, transmits a registration order to the mobile station that instructs the mobile station to register with the network, receives a registration message from the mobile station, conveys a location update request to the network that requests an update of a location of the mobile station, and receives, from the network, a location update confirmation message that confirms an updating of the location of the mobile station.

12. The apparatus of claim 11 further comprising a downstream network entity operably coupled to the base station that conveys the registration request to the base station, receives the location update request from the base station, updates a location of the mobile station in response to receiving the location update request, and conveys the location update confirmation message to the base station.

13. The apparatus of claim 12, wherein the downstream network entity is a mobile switching center.

14. The apparatus of claim 12, wherein the downstream network entity is a packet control function.

15. The apparatus of claim 12, wherein the downstream network entity comprises a registration timer and wherein the downstream network entity starts the registration timer upon conveying the registration request to the base station.

16. The apparatus of claim 15, wherein the downstream network entity conveys the location update confirmation message when the location update request is received by the downstream network entity prior to the expiration of a predetermined period of time after the downstream network entity conveys the registration request.

17. The apparatus of claim 16, wherein when the location update request is not received by the downstream network entity prior to the expiration of a predetermined period of time after the downstream network entity conveys of the registration request, the downstream network entity reconveys the registration request to the base station.

18. The apparatus of claim 11, wherein the base station further starts a location update timer and, when the location update confirmation message is not received prior to the expiration of a predetermined period of time after the conveyance of the location updating request message, reconveys the location update request to the downstream network entity.

19. The apparatus of claim 11, wherein the base station further transmits a registration confirmation message to the mobile station that confirms acceptance of the registration message.

20. The apparatus of claim 19, wherein the base station further starts a location update timer and, when the location update confirmation message is received prior to the expiration of a predetermined period of time after the conveyance of the location update request, transmits a registration confirmation message to the mobile station that confirms acceptance of the registration message.

21. A method for initiating a registration of a mobile station with a network comprising steps of:

(a) receiving a registration message from the mobile station that indicates that the mobile station desires to initiate a user-zone based registration in a user zone selected by the mobile station; and (b) in response to receiving the registration message, conveying a location update request to a downstream network entity that indicates that the mobile station seeks to register in a user zone selected by the mobile station while the mobile station is in an activated but idle state and requesting an update of a location of the mobile station.

22. The method of claim 21, further comprising a step of (c) receiving a location update confirmation message that confirms an updating of the location of the mobile station.

23. The method of claim 22, wherein step (c) further comprises a step of conveying, by the downstream network entity, the location update confirmation message.

24. The method of claim 22, wherein step (b) further comprises a step of starting a location update timer and wherein step (c) further comprises a step of, when the location update confirmation message is not received prior to the expiration of a predetermined period of time after the conveyance of the location updating request message, reconveying the location update request to the downstream network entity.

25. The method of claim 22, wherein the method further comprises a step of:

(d) transmitting a registration confirmation message to the mobile station that confirms acceptance of the registration message.

26. The method of claim 25, wherein step (b) further comprises a step of starting a location update timer and wherein step (d) comprises a step of, when the location update confirmation message is received prior to the expiration of a predetermined period of time after the conveyance of the location update request, transmitting a registration confirmation message to the mobile station that confirms acceptance of the registration message.

* * * * *